(No Model.)

M. M. BARNES.
MICROMETER INDICATING GAGE.

No. 271,401. Patented Jan. 30, 1883.

WITNESSES
B. W. Williams
Joseph Ishbaugh

INVENTOR
Merrick M. Barnes,
By his Att'y.
Henry W. Williams

UNITED STATES PATENT OFFICE.

MERRICK M. BARNES, OF BOSTON, MASSACHUSETTS.

MICROMETER INDICATING-GAGE.

SPECIFICATION forming part of Letters Patent No. 271,401, dated January 30, 1883.

Application filed November 3, 1882. (No model.)

*To all whom it may concern:*

Be it known that I, MERRICK M. BARNES, of Boston, in the county of Suffolk and State of Massachusetts, have invented a new and Improved Micrometer Indicating - Gage, of which the following is a specification.

Figure 1:
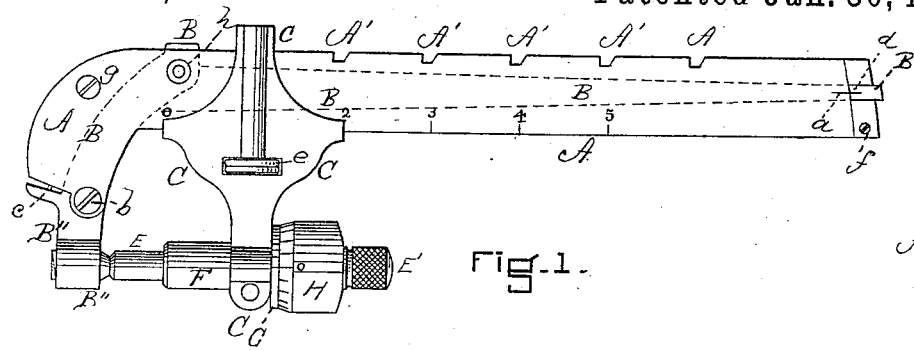
Figure 2:
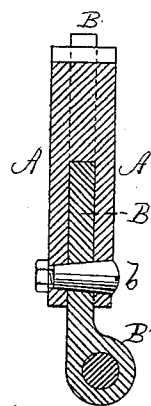
Figure 2:
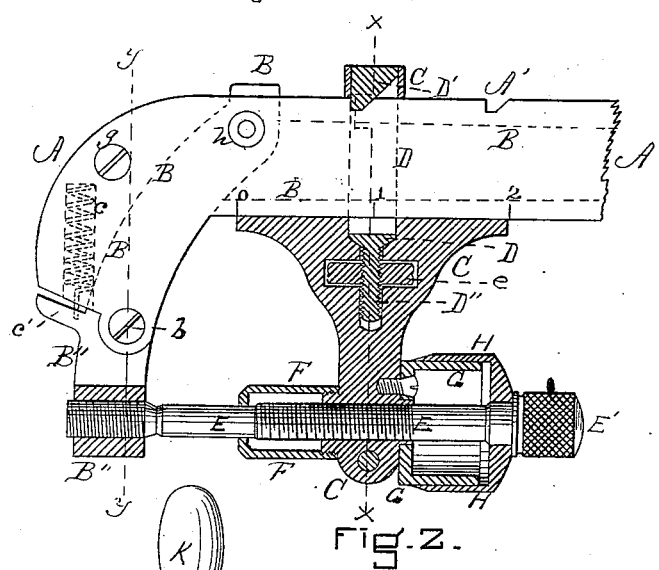
Figure 3:
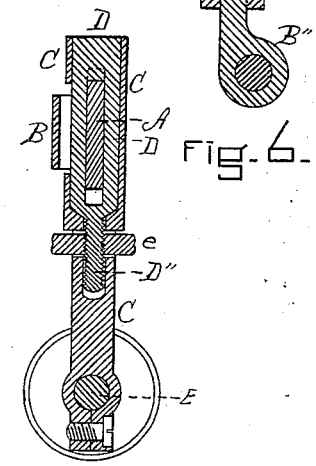
Figure 4:
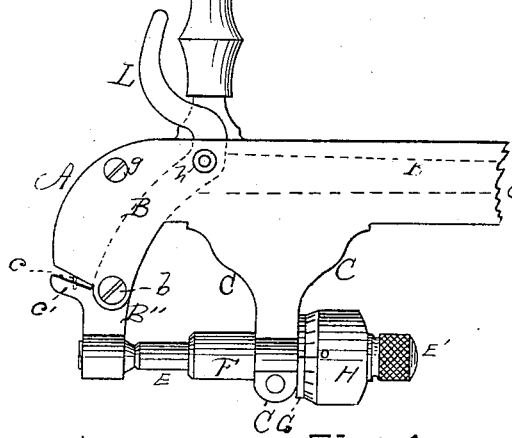
Figure 5:
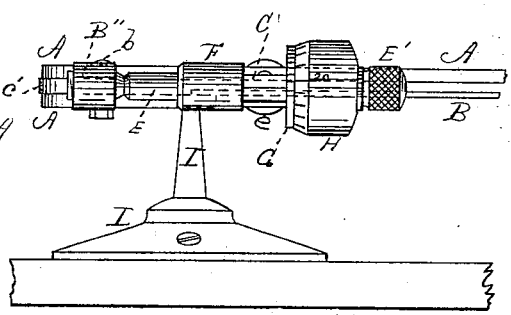

In the accompanying drawings, in which similar letters of reference indicate like parts, Figure 1 is a plan view of a micrometer indicating - gage embodying my improvements. Fig. 2 is a horizontal section of the sliding arm C. Fig. 3 is a section on line $x\ x$, Fig. 2. Fig. 4 is a plan view, showing certain modifications. Fig. 5 is an elevation of the device placed upon a supporting-stand. Fig. 6 is a section on line $y\ y$, Fig. 2.

A represents the beam, provided with notches A', placed, say, one inch apart, the distance between the notches being the same as the distance of the travel of the micrometer-screw in the sliding arm below described.

B is an indicating-arm pivoted at $b$ to the beam A, extending under the beam to its further end, and bending around it and back on its upper side at B', as shown.

B'' is an extension of the arm B, integral with it and of the shape shown, and held down (or toward the screw on the sliding arm) by the spring $c$, which is compressed between the interior of the beam A and the projection or seat $c'$ on the extension B'' of the indicating-arm. On the beam A is an indicating-mark, $a$, and on the portion B' of the arm B a similar indicating-mark, $d$. The correctness of the measurements are indicated by the coincidence of these marks $a$ and $d$.

C is an arm adapted to slide on the beam A, and to be held in any one of the notches A' by means of the bolt D. (See Figs. 2 and 3.) This bolt D is slotted so as to embrace the beam A, is provided with a tenon, D', of a shape to fit into one of the notches A', and has a thread cut on its lower end, D'', by means of which a nut, $e$, draws the tenon D' of the bolt down into or up from any notch A' in the beam. The lower portion of the sliding arm C supports and forms a nut for the micrometer or gage screw E, provided with the milled head E'. The threaded portion of the screw is protected from dust, grit, &c., by a cap, F, extending from the sliding arm C toward the extension B'' of the pivoted indicating-arm B and surrounding said screw. Provided with suitable graduated scales for measuring, say, thousandths of an inch, are the inner and outer index-cylinders, G and H. The inner index-cylinder, G, is rigidly secured to the arm C, and the outer index-cylinder is rigidly secured to the screw E, and they are operated and scaled in the usual manner.

The operation is as follows: Supposing the thickness which certain articles are required to possess is fifty-six one-thousandths of an inch, the sliding arm is so placed (by means of the bolt D and nut $e$) that its left edge lies at the indicating-mark 0 on the beam A, the tenon D' being in the notch A' nearest the extension B'' of the indicating-arm B, and the index-cylinders G H are set at fifty-six one-thousandths of an inch. The extension B'' is then pressed a little back against the spring $c$, either by pushing back the part $c'$ or moving the arm B, and the article to be gaged is placed between the extension pivoted arm B'' and the screw E. The arm B'' is released and allowed to press against the article between it and the gage-screw. If the thickness is correct—fifty-six one-thousandths of an inch—the mark $d$ on the indicating-arm and the mark $a$ on the beam will coincide. If the thickness of the article to be gaged is greater than an inch, the sliding arm C is moved back until its left edge is at one inch or two inches, as the case may be, when the bolt D is operated to draw its tenon D' down into the corresponding notch A'. The screw $f$ prevents the arm C from slipping against the part B' of the indicating-arm. The notches A' may be arranged at any desired intervals; but the distance between the notches should be equal to the travel of the gage-screw. If it is desired to keep the indicating-arm B so that the marks $a\ b$ coincide permanently, the screw $g$, which is kept, for safe keeping, in the position shown in the drawings, may be removed and placed in the socket $h$, thus rigidly holding the indicating-arm in said position.

A detachable base, I, Fig. 5, is provided, the device being adapted by means of the hole $h$, Figs. 1 and 2, to be screwed upon the top of said base, as shown in Fig. 5. The base is of course easily removable. In the construction the base should not be allowed to extend into the hole $h$ far enough to interfere with the action of the indicating-arm B.

For convenience' sake a handle, K, (see Fig. 4,) may be rigidly secured to the beam A, and an arm, L, rigidly secured to or made integral with the pivoted indicating-arm B, so that the indicating-arm may be more conveniently and easily operated.

In a modification shown in Fig. 4 the arm C is integral with the beam A, thus limiting the capacity of the device to thicknesses equal to or less than the length of the screw.

Having thus fully described my invention, what I claim, and desire to secure by Letters Patent, is—

1. A micrometer indicating-gage consisting essentially of the following parts, viz: a stationary beam, an arm provided with a micrometer-screw, and a multiplying and indicating arm pivoted to said beam, and adapted to move as a gaging-arm relatively to the arm provided with the micrometer-screw, substantially as and for the purpose set forth.

2. In a micrometer indicating-gage, the combination, with the beam and arm provided with a micrometer-screw, of the multiplying and indicating arm B, provided with the seat or projection $c'$ and the spring $c$, substantially as and for the purpose described.

3. The combination, with the beam and micrometer-screw arm of a micrometer indicating-gage, of the pivoted arm B, provided with the indicating-mark $d$, the said beam being provided with a similar mark, $a$, for the purpose specified.

4. In a micrometer indicating-gage, the combination of the beam A and pivoted indicating-arm B, each provided with a corresponding socket, $h$, for the admission of the screw $g$, substantially as and for the purpose set forth.

5. In a micrometer indicating-gage, the combination of the beam A, pivoted indicating-arm B B'', and micrometer-screw sliding arm, the said beam being provided with notches A' at a distance from each other equal to the distance of the travel of the micrometer-screw, for the purpose described.

6. The combination, with the sliding arm C and indicating-arm B, provided with the bent portion B', of the beam A, provided with the screw or similar mechanical device, $f$, as and for the purpose specified.

7. The combination, with the beam A, provided with notches A', and the sliding arm C, of the slotted bolt D, provided with the tenon D' and nut $e$, constructed substantially as and for the purpose set forth.

8. In a micrometer indicating-gage, the combination, with the micrometer-screw and the arm or nut supporting the same, of the cap F, extending from said arm or nut and covering the thread of said screw, and adapted to protect it from dust, grit, filings, &c., substantially as described.

9. The combination of the beam A of a micrometer indicating-gage and the detachable supporting-stand I, substantially as and for the purpose specified.

10. A micrometer indicating-gage in which the beam has provision for the insertion of the spindle of a supporting-stand, substantially as and for the purpose set forth.

11. The herein-described micrometer indicating-gage, consisting essentially of the beam A, the indicating-arm B, provided with the extension B'' and pivoted to said beam, and the micrometer-screw arm C, all constructed and arranged substantially as and for the purpose set forth.

MERRICK M. BARNES.

Witnesses:
 HENRY W. WILLIAMS,
 JOSEPH ISHBAUGH.